United States Patent
Sielken (10) Patent No.: US 7,117,451 B2
(45) Date of Patent: Oct. 3, 2006

(54) METHOD AND APPARATUS IN A DATA PROCESSING SYSTEM FOR LIST ORDERING WITH MULTIPLE SELECTION

(75) Inventor: Robert S. Sielken, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 09/864,752

(22) Filed: May 24, 2001

(65) Prior Publication Data

US 2002/0178191 A1    Nov. 28, 2002

(51) Int. Cl.
    *G06F 3/00* (2006.01)
(52) U.S. Cl. ............... 715/788; 715/739; 715/845; 715/798; 715/710; 707/7
(58) Field of Classification Search .......... 345/766, 345/739, 783, 823, 826, 582; 715/530, 788, 715/845; 707/7
    See application file for complete search history.

(56) References Cited

U.S. PATENT DOCUMENTS

| | | | |
|---|---|---|---|
| 5,220,675 A * | 6/1993 | Padawer et al. | 345/826 |
| 5,706,449 A * | 1/1998 | Liu et al. | 345/823 |
| 5,923,323 A | 7/1999 | Chiu et al. | 345/333 |
| 6,047,390 A | 4/2000 | Butt et al. | 714/43 |
| 6,070,170 A | 5/2000 | Friske et al. | 707/202 |
| 6,487,569 B1 * | 11/2002 | Lui et al. | 715/530 |
| 2001/0034559 A1 * | 10/2001 | Brown et al. | 700/17 |
| 2002/0091700 A1 * | 7/2002 | Steele et al. | 707/100 |
| 2002/0135621 A1 * | 9/2002 | Angiulo et al. | 345/838 |

OTHER PUBLICATIONS

Examiners Automated Search Tool, Copyright © 1999, Version 2.0.1, pp. 1-8.*

* cited by examiner

*Primary Examiner*—Ba Huynh
*Assistant Examiner*—Mylinh Tran
(74) *Attorney, Agent, or Firm*—Yee and Associates (57) ABSTRACT

A method, apparatus, and computer implemented instructions for ordering multiple elements within a set of elements in a list in a data processing system. The set of elements are presented in a list format in a graphical user interface. The present invention waits for a first user input selecting the elements within the set of elements. In response to detecting the first user input, monitoring is performed for a second user input indicating a movement of the selected elements within the set of elements. In response to detecting the second user input, the selected elements are automatically reordered within the set of elements based on the user input. In this manner, the elements may be manipulated within the list using a single user input rather that requiring a user input to manipulate each element individually.

31 Claims, 6 Drawing Sheets

METHOD AND APPARATUS IN A DATA PROCESSING SYSTEM FOR LIST ORDERING WITH MULTIPLE SELECTION

FIELD OF THE INVENTION

The present invention relates generally to an improved data processing system, and in particular to a method and apparatus for manipulating data. Still more particularly, the present invention provides a method, apparatus, and computer implemented instructions for reordering elements in a list of elements.

BACKGROUND OF THE INVENTION

Data manipulation is a commonly performed process in a data processing system. The data manipulation may take many forms. For example, text may be copied, deleted, inserted, or saved. In other instances, data presented on a graphical user interface (GUI) may be displayed in the form of a list. The list may be ordered in many different ways. For example, the list for a set of files may be alphabetical, by date of modification, by file extension, or by file size. With a list of functions or topics, the elements within this type of list may be placed in alphabetical order, the order in which elements are added, or by categories.

Oftentimes, a user may be allowed to move elements within the element list. This movement of elements within the list is also referred to as ordering or reordering. List reordering is present in many applications. Two examples of applications, which provide list reordering, are Internet Explorer and Netscape Navigator. Internet Explorer is a browser program available from Microsoft Corporation, and Netscape Navigator is a browser program available from Netscape Communications Corporation. Both of these programs have lists of languages for the user to prioritize the language in which Web pages are to be displayed. However, these lists only allow single selection. As a result, the user has to move each list element individually to reorder them. Oftentimes, having to reorder multiple elements one at a time can be time consuming and tedious.

Therefore, it would be advantageous to have an improved method and apparatus for reordering elements in a list.

SUMMARY OF THE INVENTION

The present invention provides a method, apparatus, and computer implemented instructions for ordering elements within a set of elements in a list in a data processing system. The set of elements are presented in a list format in a graphical user interface. The present invention waits for a first user input selecting the elements within the set of elements. In response to detecting the first user input, monitoring is performed for a second user input indicating a movement of the elements within the set of elements. In response to detecting the second user input, the elements are automatically reordered within the set of elements based on the user input. In this manner, the elements may be manipulated within the list using a single user input rather that requiring a user input to manipulate each element.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
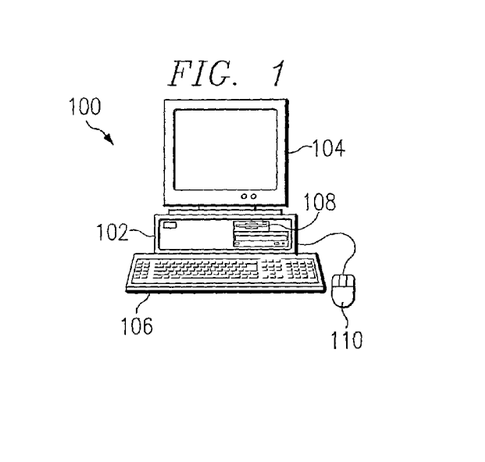
FIG. 1 a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
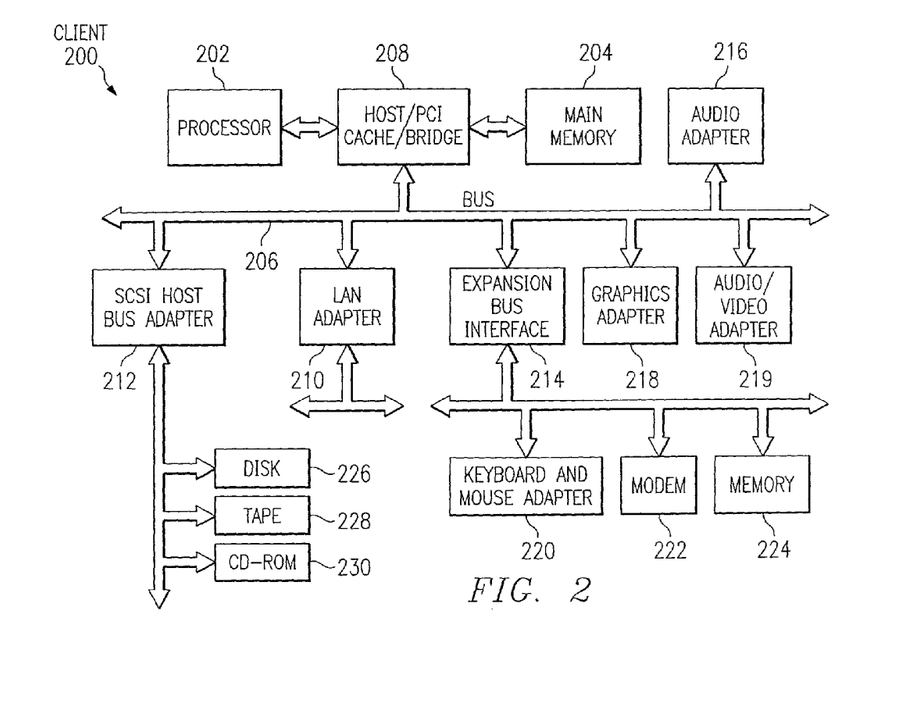
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer implemented instructions for allowing a user to reorder list elements for more than one element at a time through multiple selection. The mechanism of the present invention includes a list of elements in which the user is allowed to reorder or move elements within this list by selecting list elements and then clicking on a control, such as a navigation button, to move or reorder the list items. This navigation button may allow movement of elements in a number of different ways, such as, for example, move up/down one slot, move all the way to the top/bottom. This provides an advantage over current list manipulation systems, which only allow a single selection which means that only one list element can be moved at a time. The mechanism of the present invention allows multiple selections of elements such that multiple list elements may be moved at one time with a single user operation, such as a key stroke or clicking on a button. The elements also may be drag-and-dropped.

Figure 3A:
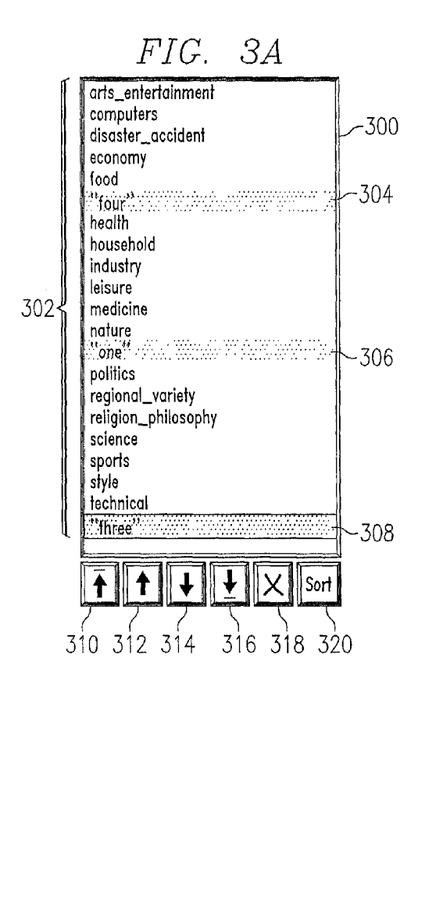
FIGS. 3A–3C are diagrams illustrating movement of multiple list elements in a list in accordance with a preferred embodiment of the present invention.
Figure 3B:
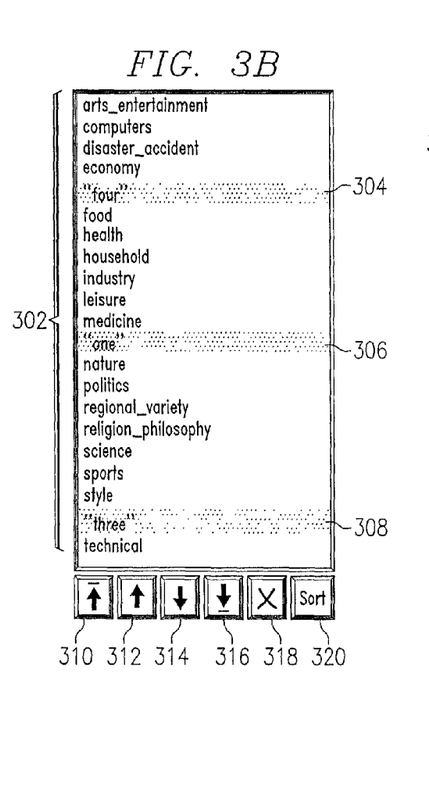
Figure 3C:
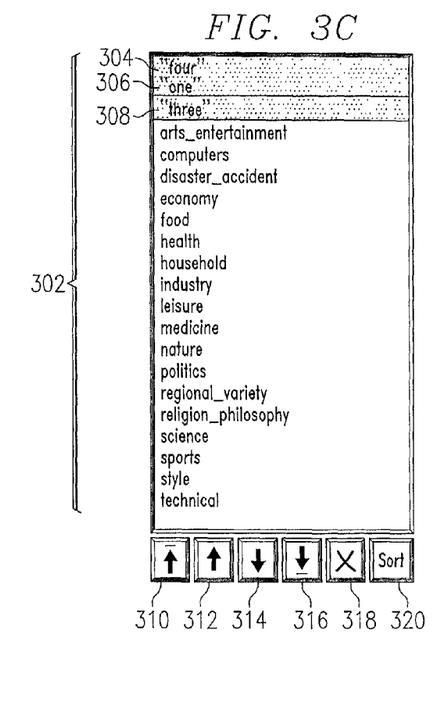

With reference now to FIGS. 3A–3C, diagrams illustrating movement of multiple list elements in a list are depicted in accordance with a preferred embodiment of the present invention. This example shows multiple selections that are spaced out with non-selected list elements in-between the selected list elements, but the mechanism of the present invention also works for consecutively selected elements as well.

In FIG. 3A, window 300 displays elements 302 in which element 304, element 306, and element 308 have been selected from elements 302. The presentation of these three elements are of the elements in an initial state prior to movement or manipulation of these three elements within elements 302.

Various manipulations of element 304, element 306, and element 308 may be made by input from a user. This input may be received or generated through the selection of buttons 310, 312, 314, 316, 318, and 320. Selection of button 310 moves all of the selected elements to the top of the list, while selection of button 312 moves all of the selected elements upward in the list by one slot or position. Selection of button 314 moves all of the selected elements downward by one slot or position. Selection of button 316 moves all of the selected elements to the bottom of the list. Selection of button 318 deletes or removes the selected elements. In this example, selection of sort button 320 sorts all of the elements within elements 302. Alternatively, the selected elements may be sorted with respect to each other and not to other elements within elements 302.

In FIG. 3B, element 304, element 306, and element 308 have been moved upward by one slot in response to a selection of button 312. In FIG. 3C, element 304, element 306, and element 308 have all been moved to the top of the list with respect to other elements within elements 302 in response to a selection of button 310. The illustration and explanation of the mechanism of the present invention in FIGS. 3A–3C have been provided for purposes of illustrating the mechanism of the present invention and are not meant as a limitation to presentation or movement of elements within a list.

The elements may be moved in any first and second directions within a list other than merely upward or downward as shown in these figures. For example, the elements may be listed horizontally rather than vertically with movement of selected elements being to the left or right with respect to the presentation of the elements.

Figures 4, 5:
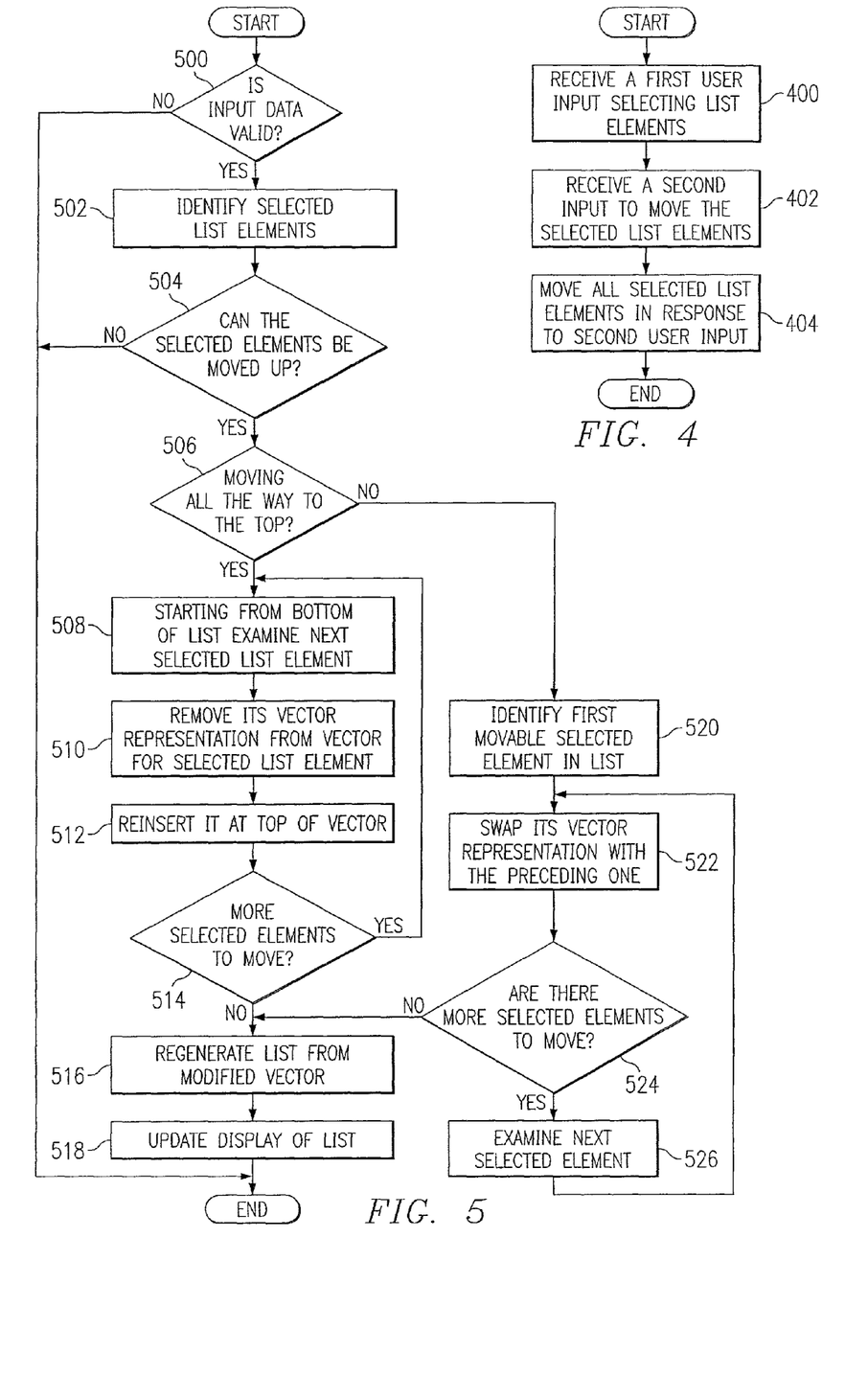
FIG. 4 is a flowchart of a process used for reordering multiple elements in accordance with a preferred embodiment of the present invention.
FIG. 5 is a flowchart of a process used for moving list elements upward in a list in accordance with a preferred embodiment of the present invention.

With reference now to FIG. 4, a flowchart of a process used for reordering multiple elements is depicted in accordance with a preferred embodiment of the present invention. The process illustrated in FIG. 4 may be implemented in a data processing system, such as data processing system 200 in FIG. 2. This process may be implemented in the form of computer instructions within a program or an operating system.

The process begins by receiving a first set of user inputs selecting a set of list elements (step 400). This set of user inputs may be, for example, a selection of the list elements by using a mouse pointer, and a selection of a button on the mouse device and a control button on the keyboard. Next, a second input to move the selected list elements is received (step 402). This second input may be, for example, a selection of a control, such as one of buttons 310, 312, 314, or 316 in FIG. 3A. Then, all of the selected list elements are moved in response to the second user input (step 404) with the process terminating thereafter.

Turning to FIGS. 5–8, a set of flowcharts illustrating processes used to reorder elements are depicted in accordant with a preferred embodiment of the present invention. In these examples, the processes are implemented using Java. With reference now to FIG. 5, a flowchart of a process used for moving list elements upward in a list is depicted in accordance with a preferred embodiment of the present invention. The process illustrated in FIG. 5 may be implemented in a data processing system, such as data processing system 200 in FIG. 2.

The process begins with a determination as to whether input data is valid (step 500). The processes are implemented as code in a programming environment, such as Java. Since this is a static function that is used by many different Java classes, a test is used to ensure that the list and vector passed in are valid input before an operation is performed. If an operation is attempted and the list and vector do not exist or is a null, then a NullPointerException occurs. So, to avoid the case where the list or vector given to the function does not exist (is null), a check is first made, in step 500, to ensure a null does not exist. The input data includes information to identify which elements are selected for movement as well as the type of movement or manipulation to be performed on the selected elements. If the input data is not valid, the process terminates. Otherwise, a selected list of elements is identified (step 502). This list of elements is also referred to as list elements.

Next, a determination is made as to whether the selected list elements can be moved up in the list (step 504). A more detailed description of step 504 is found in FIG. 6 below. If the selected list elements cannot be moved up in the list, the process terminates. Otherwise, a determination is made as to whether the selected list elements are to be moved all the way to the top (step 506). If the selected list elements are to be moved all the way to the top, the list is examined starting from the bottom of the list to find the next selected list element (step 508). Then, a vector representation is removed from the vector for the selected list element (step 510). The selected list element is then reinserted at the top of the vector (step 512).

A determination is then made as to whether more selected list elements are present to move (step 514). If no more selected list elements are present to move, a list is regenerated from the modified vector (step 516). Then, the display of the list is updated (step 518) with the process terminating thereafter. If more selected elements are present, the process returns to step 508 as described above.

With reference again to step 506, if the selected list elements are not to be moved all the way to the top, a first movable selected list element in the list is identified, starting from the top and working towards the bottom in this example (step 520). Next, a vector representation for the selected list element is swapped with the preceding one (step 522). A determination is made as to whether more selected list elements to move are present (step 524). If no more selected list elements are present to move, the process proceeds to step 516 as described above. Otherwise, the next selected list element is examined (step 526) and the process returns to step 522 as described above.

Figure 6:
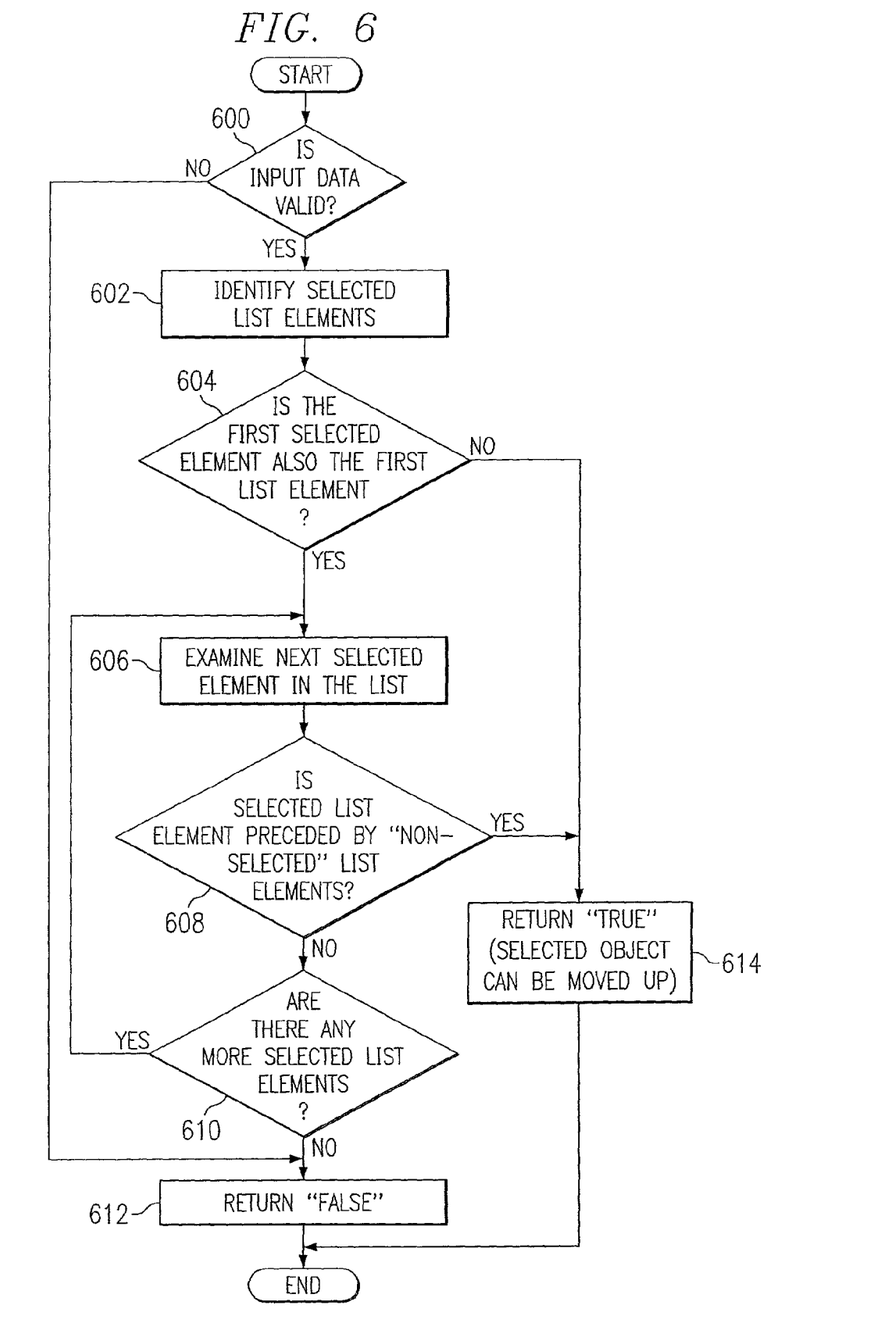
FIG. 6 is a flowchart of a process used for determining whether selected elements can be moved up in accordance with a preferred embodiment of the present invention.

Turning next to FIG. 6, a flowchart of a process used for determining whether selected elements can be moved up is depicted in accordance with a preferred embodiment of the present invention. The process illustrated in FIG. 6 is a more detailed description of step 504 in FIG. 5.

The process begins with a determination as to whether input data is valid (step 600). If the input data is valid, the selected list elements are identified (step 602). A determination is then made as to whether the first selected element also is the first list element (step 604). If the first selected element also is the first list element, the next selected element in the list, starting with the first unexamined selected list element, is examined (step 606). Next, a determination is made as to whether the selected list element is preceded by an "non-selected" element (step 608). If the selected list element is not preceded by an "non-selected" element, a determination is made as to whether more selected list elements are present (step 610). If no more selected list elements are present, a "false" is returned (step 612) with the process terminating thereafter.

Turning back to step 600, if the input data is not valid, the process proceeds to step 612 as described above. With reference again to step 604 if the first selected list element is not the first list element, a "true" is returned, meaning that the selected object can be moved up in the list (step 614) with the process terminating thereafter. With reference again to step 608, if the selected list element is preceded by "non-selected" elements the process proceeds to step 614 as described above. Turning back to step 610, if additional selected elements are present, the process returns to step 606 as described above.

Basically, the process examines each selected element to see if the selected element has an non-selected element directly above it. If the selected element has an non-selected element above it, then the selected list element may be moved above the non-selected element. The code does this by checking the indices, which are ordered, of the selected elements. For example, element at index 4 is selected and the next selected element is at index 6, then it is known there is one element (at index 5) above the selected element at index 6, which is non-selected.

Figure 7:
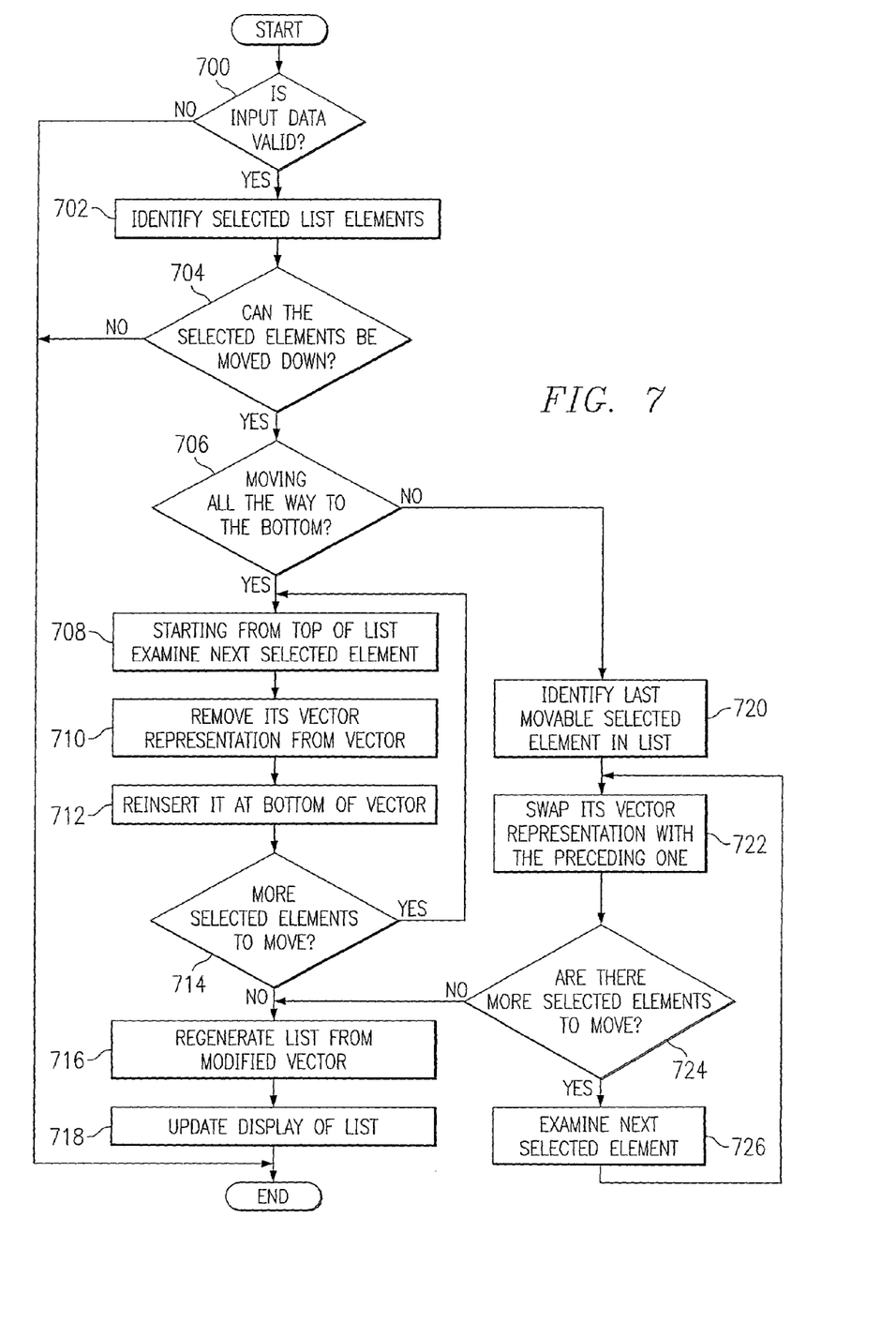
FIG. 7 is a flowchart of a process used for moving list elements downward in a list in accordance with a preferred embodiment of the present invention.

Turning next to FIG. 7, a flowchart of a process used for moving list elements downward in a list is depicted in accordance with a preferred embodiment of the present invention. The process illustrated in FIG. 7 may be implemented in a data processing system, such as data processing system 200 in FIG. 2.

The process begins with a determination as to whether input data is valid (step 700). The input data includes information to identify which elements are selected for movement as well as the type of movement or manipulation to be performed on the selected elements. If the input data is not valid, the process terminates. Otherwise, a selected list of elements is identified (step 702). This list of elements is also referred to as list elements.

Next, a determination is then made as to whether the selected list elements can be moved down in the list (step 704). If the selected list elements cannot be moved down in the list, the process terminates. Otherwise, a determination is made as to whether the selected list elements are to be moved all the way to the bottom (step 706). If the selected list elements are to be moved all the way to the bottom, starting from the top of the list to find the next unexamined selected list element, the next unexamined selected list element is examined (step 708). Then, a vector representation is removed from the vector for the selected list element (step 710). The selected list element is then reinserted at the bottom of the vector (step 712).

A determination is then made as to whether more selected list elements are present to move (step 714). If additional selected list elements are not present to move, a list is regenerated from the modified vector (step 716). The display of the list is updated (step 718) with the process terminating thereafter. If additional selected list elements are present, the process returns to step 708 as described above.

With reference again to step 706, if the selected list elements are not to be moved all the way to the bottom, a first movable selected list element in the list is identified (step 720). The process starts with the bottom of the list and works back towards the top of the list in this example. Next, a vector representation for the selected list element is swapped with the succeeding one (step 722). A determination is made as to whether more selected list elements to move are present (step 724). If no more selected list elements are present to move, the process proceeds to step 716 as described above. Otherwise, the next selected list element is examined (step 726) and the process returns to step 722 as described above.

Figure 8:
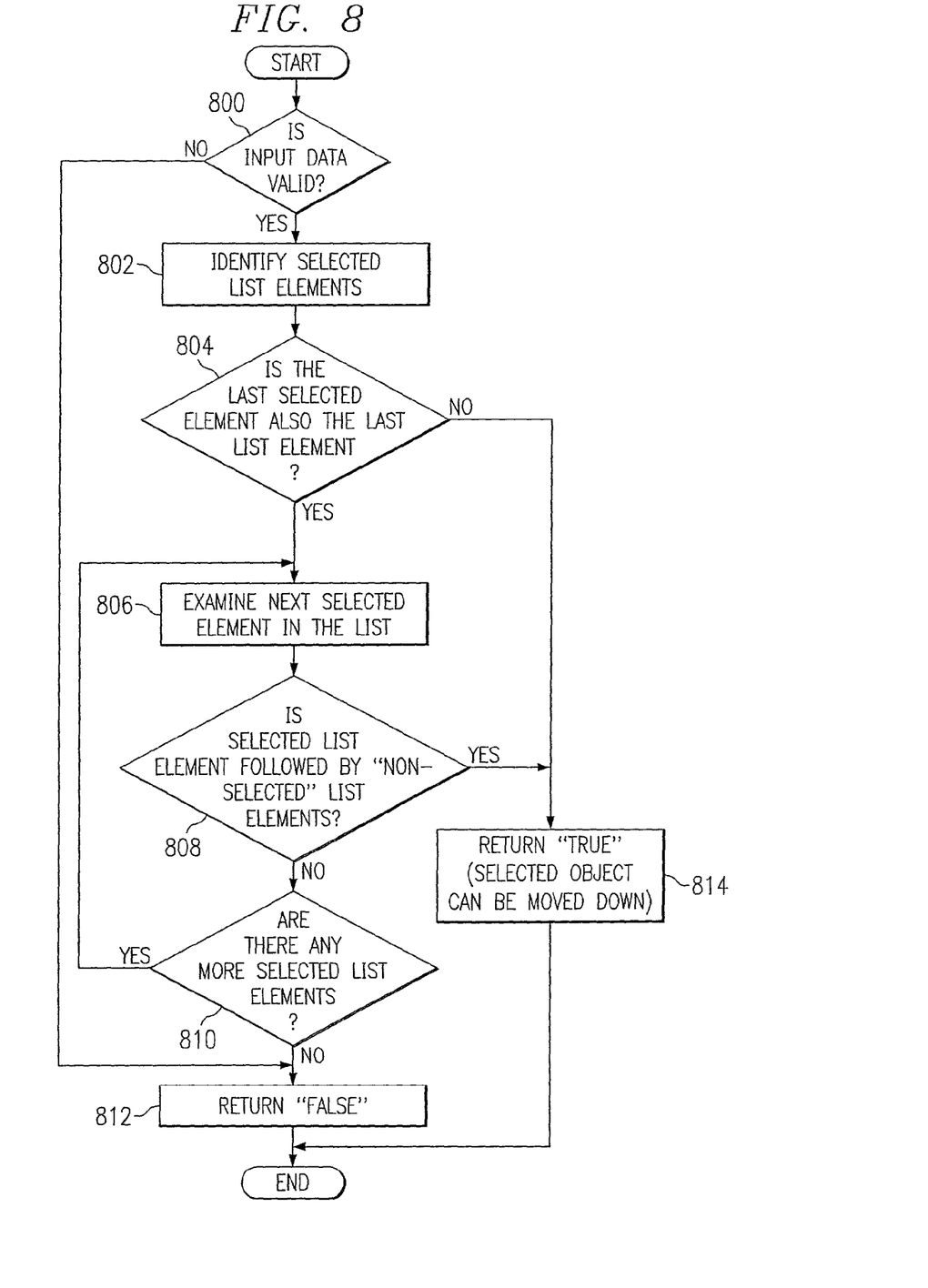
FIG. 8 is a flowchart of a process used for determining whether selected elements can be moved down in accordance with a preferred embodiment of the present invention.

Turning next to FIG. 8, a flowchart of a process used for determining whether selected elements can be moved down is depicted in accordance with a preferred embodiment of the present invention. The process illustrated in FIG. 8 is a more detailed description of step 704 in FIG. 7.

The process begins with a determination as to whether input data is valid (step 800). If the input data is valid, the selected list elements are identified (step 802). A determination is then made as to whether the last selected element also is the last list element (step 804). If the last selected element also is the last list element, the next selected element in the list, starting with the first unexamined selected list element is examined (step 806). In this example, the process works on elements from the bottom of the list towards the top of the list.

Next, a determination is made as to whether the selected list element is followed by an "non-selected" element (step 808). If the selected list element is not followed by an "non-selected" element, a determination is made as to whether more selected list elements, excluding the last one, are present (step 810). If no more selected list elements are present, a "false" is returned (step 812) with the process terminating thereafter.

Turning back to step 800, if the input data is not valid, the process proceeds to step 812 as described above. With reference again to step 804 if the last selected list element is not the last list element, a "true" is returned (selected object can be moved down) (step 814) with the process terminating thereafter. With reference again to step 808, if the selected list element is followed by "non-selected" elements the process proceeds to step 814 as described above. Turning back to step 810, if additional selected elements are present, the process returns to step 806 as described above.

Thus, the present invention provides an improved method, apparatus, and computer implemented instructions for moving or reordering elements in a list by allowing multiple selection to be utilized. As described above, the mechanism of the present invention has an advantage of allowing the user to move list elements more easily and naturally. The ease of use comes from using a single input, such as, for example, one click or keystroke, to move many list elements as opposed to having to use a user input, such as one click, to move each of the list elements individually. For example, the present invention allows one click to move ten items as opposed to ten clicks to move the ten items one at a time with the currently available processes. The more natural list operation is most evident when using move all the way to one end of a list movements, such as top/bottom or left/right. Given multiple selections, the relative order of the selected items is preserved ("four" was ahead of "one" in the initial list in FIG. 3A, and it remained so after the move to the top operation shown in FIG. 3C). Using the move to the top operation on individual elements would require the user to do this on the last element first to preserve the initial relative ordering in the end (the user would have to move "three" all the way to the top, then "one" and finally "four" to preserve the initial ordering). This is counterintuitive to most users who are not used to thinking about multiple level moves/sorts where the least significant operation must be done first and the most significant operation done last.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, although the description of the process flows are directed towards Java, the processes may be implemented in many other types of programming languages, such as C. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method in a data processing system for ordering elements included within a list, the method comprising:
   presenting the elements in a list format in a first order in a graphical user interface;
   receiving a first user input selecting a set of the elements from the list;
   responsive to detecting the first user input, monitoring for a second user input, indicating a movement of the set of elements within the list; and
   responsive to detecting the second user input, automatically reordering the elements in the list including:
   when the set of elements comprises a plurality of contiguous elements, automatically reordering the elements in the list by moving, within the list, the set of elements together as one unit as if said set were a single list element to create a modified list of elements in a second order, said set of elements appearing to a user as having been moved simultaneously; and
   when the set of elements comprises a plurality of non-contiguous elements, automatically reordering the elements in the list by moving, within the list, the set of elements as one unit, said set of elements appearing to a user as having been moved simultaneously, wherein each element in the set of elements has a relative order and spacing to another element in the set of elements, and wherein the relative order and spacing are preserved.

2. The method of claim 1, wherein the second user input causes the set of elements to be moved in a first direction within the list by a selected number of locations.

3. The method of claim 1, wherein the second user input causes the set of elements to be moved in a second direction within the list by a selected number of locations.

4. The method of claim 1, wherein the second user input causes the set of elements to be moved to a first end of the list.

5. The method of claim 1, wherein the second user input causes the set of elements to be moved to a second end of the list.

6. The method of claim 1, wherein the second user input is received by a selection of a control associated with the set of elements.

7. The method of claim 6, wherein the control is a navigation button.

8. The method of claim 1, wherein the second user input includes an identification of a direction in which the set of elements are to be moved and wherein the automatically reordering step comprises:
   determining whether the set of elements can be moved in the direction identified by the second user input; and
   responsive to a determination that the set of elements can be moved in the direction, moving the set of elements in the direction.

9. The method of claim 1 further comprising:
   displaying the list in a window.

10. The method of claim 1, wherein the user input is received from a user selection of a control displayed with the list.

11. A data processing system comprising:
   a bus system;
   a communication unit connected to the bus system;
   a memory connected to the bus system, wherein the memory include, a set of instructions; and
   a processing unit connected to the bus system, wherein the processing unit executes the set of instructions to present elements included within a list in a list format in a first order in a graphical user interface; receive a first user input selecting a set of elements from the list; monitor for a second user input, indicating a movement of the set of elements in the list in response to detecting the first user input; and automatically reordering the elements in the list including: when the set of elements comprises a plurality of contiguous elements, automatically reorder the elements in the list by moving, within the list, the set of elements together as one unit as if said set were a single list element to create a modified list of elements in a second order, said set of elements appearing to a user as having been moved simultaneously; and when the set of elements comprises a plurality of non-contiguous elements, automatically reorder the elements in the list by moving, within the list, the set of elements as one unit, said set of elements appearing to a user as having been moved simultaneously, wherein each element in the set of elements has a relative order and spacing to another element in die set of elements, and wherein the relative order and spacing are preserved.

12. A data processing system for ordering elements included within a list, the data processing system comprising:
   presenting means for presenting the elements in a, list format in a first order in a graphical user interface;
   receiving means for receiving a first user input selecting a set of the elements from the list;
   monitoring means, responsive to detecting the first user input, for monitoring for a second user input, indicating a movement of the set of elements within the list; and
   reordering means, responsive to detecting the second user input, for automatically reordering the elements in the list including;
   when the set of elements comprises a plurality of contiguous elements, reordering means for automatically reordering the elements in the list by moving, within the list, the set of elements together as one unit as if said set were a single list element to create a modified list of elements in a second order; and
   when the set of elements comprises a plurality of non-contiguous elements, reordering automatically reordering the elements in the list by moving, within the list, the set of elements as one unit, said sat of elements appearing to a user as having been moved simultaneously by moving, within the list, the set of elements together as one unit as if said set were a single list element to create a modified list of elements in a second orders said set of elements appearing to a user as having been moved simultaneously, wherein each element in the set of elements has a relative order and spacing to another element in the set of elements, and wherein the relative order and spacing are preserved.

13. The data processing system of claim 12, wherein the second user input causes the set of elements to be moved in a first direction within the list by a selected number of locations.

14. The data processing system of claim 12, wherein the second user input causes the set of elements to be moved in a second direction within the list by a selected number of locations.

15. The data processing system of claim 12, wherein the second user input causes the set of elements to be moved a first end of the list.

16. The data processing system of claim 12, wherein the second user input causes the set of elements to be moved to a second end of the list.

17. The data processing system of claim 12, wherein the second user input is received by a selection of a control associated with the set of elements.

18. The data processing system of claim 17, wherein the control is a navigation button.

19. The data processing system of claim 12, wherein the second user input includes an identification of a direction in which the set of elements are to be moved and wherein the automatically reordering means comprises:
   first means for determining whether the set of elements can be moved in the direction identified by the second user input; and
   second means, responsive to a determination that the set of elements can be moved in the direction, for moving the set of elements in the direction.

20. The data processing system of claim 12 further comprising:
   displaying means for displaying the list in a window.

21. The data processing system of claim 12, wherein the user input is received from a user selection of a control displayed with the list.

22. A computer recordable medium comprising a computer program product for ordering elements included within a list, the computer program product comprising:
   first instructions for presenting the elements in a list format in a first order in a graphical user interface;
   second instructions for receiving a first user input selecting the set of elements from the list;
   third instructions, responsive to detecting the first user input, for monitoring for a second user input indicating a movement of the set of elements; and fourth instructions, responsive to detecting the second user input, for automatically reordering the elements in the list including;

when the set of elements comprises a plurality of contiguous elements, instructions for automatically reordering the elements in the list by moving, within the list, the set of elements together as one unit as if said set were a single list element to create a modified list of elements in a second order, said set of elements appearing to a user as having been moved simultaneously; and when the set of elements comprises a plurality of non-contiguous elements, instructions for automatically reordering the elements in the list by moving, within the list, the set of elements as one unit, said set of elements appearing to a user as having been moved simultaneously, wherein each element in the set of elements has a relative order and spacing to another element in the set of elements, and wherein the relative order and spacing are preserved.

23. The computer recordable medium of claim 22, wherein the second user input causes the set of elements to be moved in a first direction within the list by a selected number of locations.

24. The computer recordable medium of claim 22, wherein the second user input causes the set of elements to be moved in a second direction within the list by a selected number of locations.

25. The computer recordable medium of claim 22, wherein the second user input causes she set of elements to be moved to a first end of the list.

26. The computer recordable medium of claim 22, wherein the second user input causes the set of elements to be moved to a second end of the list.

27. The computer recordable medium of claim 22, wherein the second user input is received by a selection of a control associated with the set of elements.

28. The computer recordable medium of claim 27, wherein the control is a navigation button.

29. The computer recordable medium of claim 22, wherein the second user input includes an identification of a direction in which the set of elements are to be moved and wherein the fourth instructions comprises:

first sub-instructions for determining whether the set of elements can be moved in the direction identified by the second user input; and second sub-instructions, responsive to a determination that the set of elements can be moved in the direction, for moving each element in the set of elements in the direction.

30. The computer recordable medium of claim 22 further comprising:

third instructions for displaying the list in a window.

31. The computer recordable medium of claim 22, wherein the user input is received from a user selection of a control displayed with the list.

* * * * *